United States Patent
Harada (10) Patent No.: US 11,731,642 B2
(45) Date of Patent: Aug. 22, 2023

(54) CONTROL DEVICE FOR MOBILE BODY

(71) Applicant: Mazda Motor Corporation, Hiroshima (JP)

(72) Inventor: Yasuhiro Harada, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 289 days.

(21) Appl. No.: 17/200,928

(22) Filed: Mar. 15, 2021

(65) Prior Publication Data
US 2021/0354709 A1    Nov. 18, 2021

(30) Foreign Application Priority Data
May 14, 2020    (JP) .................. 2020-085106

(51) Int. Cl.
| | |
|---|---|
| *B60W 50/06* | (2006.01) |
| *B60H 1/32* | (2006.01) |
| *B60W 10/06* | (2006.01) |
| *B60W 10/18* | (2012.01) |
| *B60W 10/30* | (2006.01) |
| *F02B 63/06* | (2006.01) |
| *F02B 67/06* | (2006.01) |
| *G05B 23/02* | (2006.01) |

(52) U.S. Cl.
CPC .......... *B60W 50/06* (2013.01); *B60H 1/3222* (2013.01); *B60W 10/06* (2013.01); *B60W 10/18* (2013.01); *B60W 10/30* (2013.01); *F02B 63/06* (2013.01); *F02B 67/06* (2013.01); *G05B 23/0235* (2013.01)

(58) Field of Classification Search
CPC ......... F02B 67/06; F02B 63/06; B60W 10/30; B60W 10/18; B60W 10/06; B60W 50/06; B60H 1/322
See application file for complete search history.

(56) References Cited

U.S. PATENT DOCUMENTS

| | | | | |
|---|---|---|---|---|
| 7,318,629 B1 * | 1/2008 | Sun | ................ | B60W 10/11 701/41 |
| 2004/0054450 A1 * | 3/2004 | Nakamura | ................ | B60T 8/00 701/22 |

FOREIGN PATENT DOCUMENTS

| | | |
|---|---|---|
| CN | 110406530 A | 11/2019 |
| JP | 2016-192010 A | 11/2016 |

* cited by examiner

*Primary Examiner* — Kevin A Lathers
(74) *Attorney, Agent, or Firm* — Xsensus LLP (57) ABSTRACT

A controller includes a control section configured to actually control a hardware unit, an identification model including a hard model obtained by modeling a dynamic characteristic of the hardware unit and a soft model configured to execute same processing as processing performed on the hard model by the control section, and an adjustment section configured to update a dynamic characteristic of a model of the hardware unit in the hard model such that an output value of the hard model obtained by processing of the soft model matches an actual output value of the hardware unit.

7 Claims, 8 Drawing Sheets

CONTROL DEVICE FOR MOBILE BODY

CROSS-REFERENCE TO RELATED APPLICATION

This application claims priority to Japanese Patent Application No. 2020-085106 filed on May 14, 2020, the entire disclosure of which is incorporated by reference herein.

BACKGROUND

A technology disclosed herein belongs to a technical field related to a control device for a mobile body.

In recent years, the development of automatic driving systems has been promoted nationally, and almost all hardware units mounted on mobile bodies are electrically controlled. Specifically, in automatic driving, each hardware unit has to be controlled in consideration of riding comfort of an occupant and safety in a surrounding environment.

For example, an electronic control device described in Japanese Unexamined Patent Publication No. 2016-192010 includes a first arithmetic section and a second arithmetic section that have different features in terms of safety, a first prediction section and a second prediction section that predict future states of a vehicle, based on respective arithmetic operation results of the first arithmetic section and the second arithmetic section, an evaluation section that evaluates, based on quantities that represent the predicted future states, safety for the arithmetic operation results of the first arithmetic section and the second arithmetic section, and a selection section that outputs, based on a result of the evaluation section, a result that satisfies at least safety requirements as a final arithmetic operation result.

SUMMARY

Incidentally, as described in Japanese Unexamined Patent Publication No. 2016-192010, when a future state of a mobile body (vehicle) is anticipated and each hardware unit is controlled, a control amount (a fuel injection amount, a hydraulic pressure of a brake, or the like) of each hardware unit is set such that the anticipated future state is realized. However, when a malfunction due to aged deterioration or the like has occurred in the hardware unit, by control with the set control amount, a target future state (driving torque or braking distance) is not realized in some cases.

When the mobile body is traveling by manual driving executed in accordance with an intention of a driver, the driver can recognize a position in which a malfunction has occurred to a certain extent, based on his or her experience or the like, and cope with the malfunction by an operation performed by the driver. However, when the mobile body is traveling by assist driving in which an operation of the driver is assisted or automatic driving that does not require an operation of the driver, it is hard to cause the driver's determination based on his or her experience or the like to intervene the driving, and therefore, it is difficult to specify a position of a malfunction and cope with the malfunction by an operation of the driver.

In general, a difference between an output of the actual hardware unit and a target output is compensated by feedback control. However, in a state where a cause for the difference is not known, there is a probability that appropriate compensation cannot be performed. In order to identify the cause, it is necessary to record changes in output of the hardware unit while appropriately changing a control content of the hardware unit, but it is difficult to perform verification of the actual hardware unit while the mobile body is in operation.

The technology disclosed herein allows specifying a malfunction of a hardware unit and appropriately controlling an operation of a mobile body without adversely influencing the operation of the mobile body.

The technology disclosed herein is directed to a control device for a mobile body with a hardware unit mounted therein.

The control device for the mobile body includes a control section configured to actually control the hardware unit, a first identification model including a first hard model obtained by modeling a dynamic characteristic of the hardware unit and a first soft model configured to receive same input information as input information input to the control section and to execute same processing as processing performed on the hardware unit by the control section on the first hard model, a second identification model including a second hard model obtained by modeling a dynamic characteristic of the hardware unit and a second soft model configured to receive same input information as input information input to the control section and to execute same processing as processing performed on the hardware unit by the control section on the second hard mode, a normative value calculation section configured to calculate an output value serving as a norm for the hardware unit for the input information using the first identification model, and an adjustment section configured to update a dynamic characteristic of a model of a hardware unit in the second hard model, based on the normative output value and an actual output value of the hardware unit, such that an output value of the second hard model obtained by processing of the second soft model matches the actual output value of the hardware unit.

With this configuration, the normative output value corresponding to a target output value of the hardware unit can be calculated using the first identification model. The second hard model of the second identification model is updated by the adjustment section such that the normative output value is the actual output value of the hardware unit. Update information of the adjustment section is information indicating a different portion from the first hard model in the first identification model, and therefore, a position in which a malfunction has actually occurred can be specified based on the update information. Thus, by changing a control content of the hardware unit in accordance with the specified position of the malfunction, the output value of the hardware unit can be made close to the normative output value, and a control state of the mobile body can be made as close to a desired control state as possible.

Moreover, this control is executed using not the actual hardware unit but a model obtained by modeling the hardware unit, and therefore, even when the mobile body is in operation, the operation of the mobile body is less likely to be adversely influenced.

Therefore, a malfunction of the hardware unit can be specified and an operation of the mobile body can be appropriately controlled without adversely influencing the operation of the mobile body.

According to one embodiment, the control device for the mobile body further includes an experimental model including a third hard model obtained by modeling a dynamic characteristic of the hardware unit and a third soft model configured to execute same processing as processing performed on the hardware unit by the control section on the third hard model, and an experimental section configured to perform processing on the third hard model by the third soft model, based on the condition indicated by the input information or altered information obtained by changing the input information, the adjustment section is configured to perform similar update on the third hard model when updating the second hard model, and the experimental section calculates a specific control condition used for controlling the third hard model such that an output obtained when the third soft model performs processing on the third hard model matches the normative output value calculated by the normative value calculation section.

With this configuration, similar update to the update performed on the second hard model is performed on the third hard model of the experimental model, and therefore, the dynamic characteristic of the actual hardware unit is reflected on the third hard model. Furthermore, by performing a simulation using the experimental model by the experimental section, control conditions in accordance with various environments can be calculated. For example, by simulating how the output value of the hardware unit changes when an outside air temperature is set extremely high or low as compared to an actual outside air temperature, the control conditions of the hardware unit can be set to appropriate contents (contents of the specific control condition) when the mobile body is exposed to any one of the environments. For example, when the hardware unit is a driving system hardware unit, an environment condition under which the driving system hardware unit stops an operation can be anticipated by the experimental section in advance. Thus, when it is anticipated that the mobile body will be exposed to an environment that satisfies the environment condition, this anticipation can be reported to the driver and sudden stop of the mobile body can be prevented. As a result, the operation of the mobile body can be more appropriately controlled.

In the above-described embodiment, the control device may further include a storage section configured to store the specific control condition calculated by the experimental section, and the control section may be configured to read the specific control condition corresponding to the condition indicated by the altered information from the storage section and control the hardware unit in accordance with the specific control condition when the condition indicated by the input information is similar to a condition indicated by the altered information.

With this configuration, the specific control condition of the hardware unit can be calculated in advance for various environments by the experimental section and the specific control conditions can be stored. Then, when an actual environment is similar to an environment anticipated by the experimental section in a simulation, the operation of the mobile body can be appropriately controlled only by reading the stored specific control condition.

In the control device for the mobile body, the normative value calculation section may be configured to calculate a normative engine parameter indicating an engine output serving as a norm, and the adjustment section may be configured to adjust a dynamic characteristic of a model related to the engine in the second hard model such that a verification engine parameter calculated using the second identification model matches an actual engine parameter that is an actual engine parameter obtained by processing of the control section.

That is, the engine is a hardware unit that mainly takes a role of a driving system, and therefore, is a hardware unit that is to be in particular appropriately controlled in operation control for the mobile body. The engine includes a plurality of components, such as a plurality of valves, an injector, an ignition plug, or the like, and there are many possible causes for a malfunction, and therefore, when verification of a cause for a difference between the normative engine parameter and the actual engine parameter is performed in the actual hardware unit, it takes a time to specify the malfunction. Therefore, when the hardware unit is an engine, this embodiment can more appropriately exhibit an effect of allowing specifying the malfunction of the hardware unit and appropriately controlling an operation of the mobile body without adversely influencing the operation of the mobile body.

In the control device for the mobile body, the hardware unit may include a brake, the normative value calculation section may be configured to calculate a normative braking parameter that is a parameter related to braking, the normative braking parameter serving as a norm, and the adjustment section may be configured to adjust a dynamic characteristic of a model related to the brake in the second hard model such that a verification braking parameter calculated using the second identification model matches an actual braking parameter that is an actual braking parameter obtained by processing of the control section.

That is, the brake includes many parts and there are a plurality of possible causes for a malfunction, and therefore, when verification of a cause for a difference between the normative braking force and an actual braking force is performed in the actual hardware unit, it takes a time to specify the malfunction. Therefore, when the hardware unit is a brake, this embodiment can more appropriately exhibit an effect of allowing specifying the malfunction of the hardware unit and appropriately controlling the operation of the mobile body without adversely influencing the operation of the mobile body.

DETAILED DESCRIPTION

An exemplary embodiment will be described in detail below with reference to the accompanying drawings.

Figure 1:
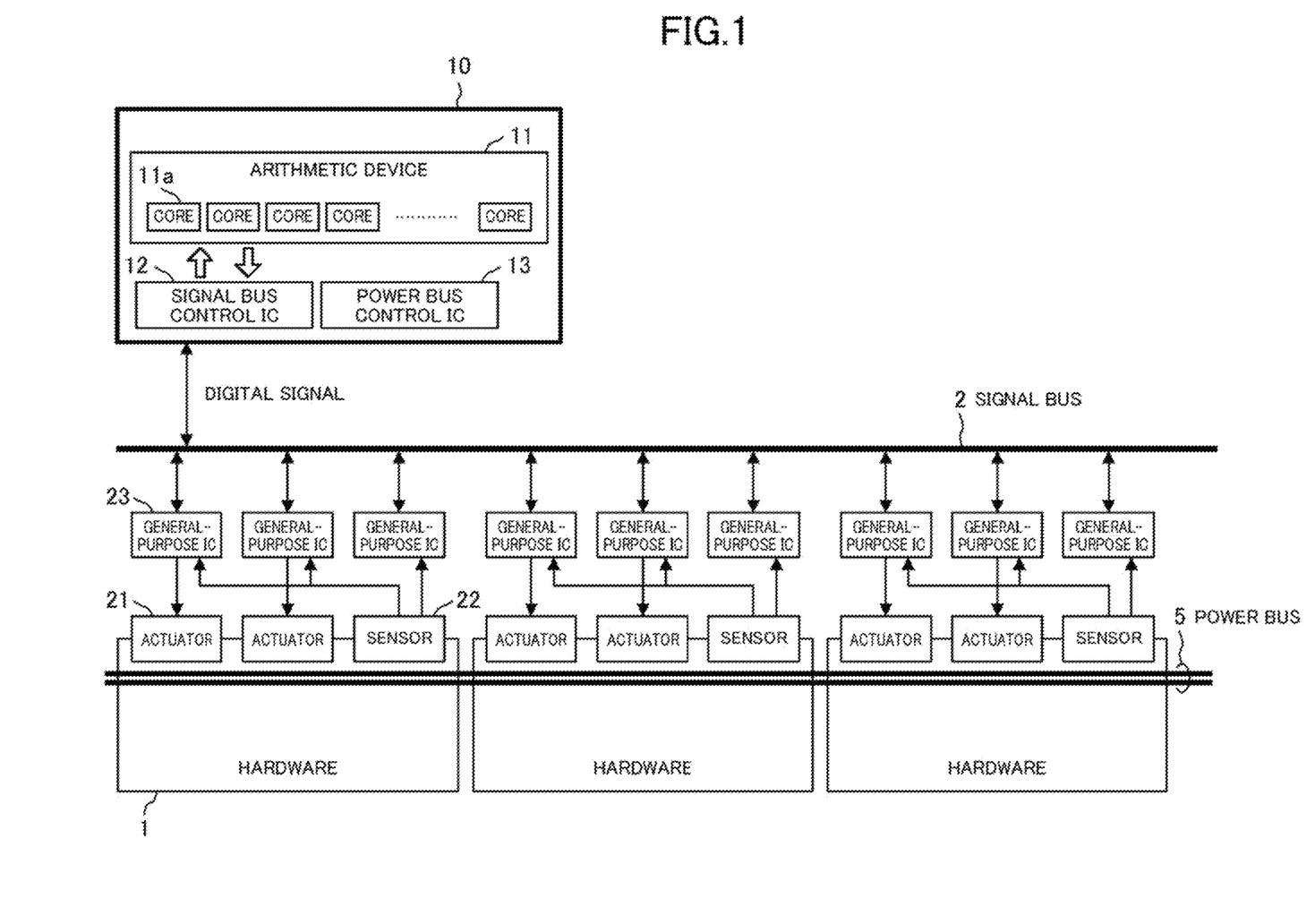
FIG. 1 is a diagram illustrating a configuration example of a control system of a vehicle in which a control device according to an embodiment is mounted.

FIG. 1 is an image diagram illustrating a configuration example of a control system of a mobile body according to an embodiment. A plurality of hardware units 1 are mounted on the mobile body and the control system controls each of the hardware units 1. In a case of an automobile as an example of the mobile body, the hardware units 1 are, for example, an engine, a transmission, a brake, and the like.

In the control system of FIG. 1, a signal bus 2 that performs transmission of digital signals is provided. A protocol of the signal bus 2 is, for example, a controller area network (CAN), Ethernet (registered trademark), or the like. A controller 10 includes an arithmetic device 11 configured to calculate an operation of the mobile body, a signal but control IC 12 configured to input or output a digital signal from or to the signal bus 2, and a power bus control IC 13 configured to control a power bus 5. The arithmetic device 11 includes, for example, a plurality of arithmetic cores 11a and is configured to execute an ultra-high speed arithmetic operation.

Each of the hardware units 1 is provided with an actuator 21 configured to control the hardware unit 1 and a sensor 22 configured to detect a state of the hardware unit 1. The actuators 21 are, for example, an injector or an ignition plug provided in the engine, a brake device provided in each wheel, a power steering device configured to assist a steering operation, a power window device provided in each door, or the like. The sensors 22 are, for example, a crank position sensor configured to detect a rotation position of a crank shaft, a throttle position sensor configured to detect an opening degree of a throttle valve, or the like.

General-purposes IC 23 are provided for the actuators 21 and the sensors 22. The general-purposes IC 23 are connected to the signal bus 2. That is, a digital signal is transmitted through a communication path between the controller 10 and each of the general-purposes IC 23 without using a relay electronic control unit (ECU).

The controller 10 performs an arithmetic operation that determines an operation of the mobile body by the arithmetic device 11 and generates a digital signal that defines an operation of each of the actuators 21 in accordance with a result of the arithmetic operation. The digital signal represents, for example, physical quantity data that defines the operation of the actuator 21. Specifically, for example, the physical quantity data is energy that represents a task that is to be performed by the actuator 21, a temperature or a pressure that is a target to be adjusted by the actuator 21, an engine speed, an opening degree of a valve, or the like. The digital signal specifies, for example, an electric signal that is given to a device of the actuator. Specifically, for example, the digital signal specifies a signal waveform of the electric signal, a time that indicates a generation timing of the electric signal, a frequency or a voltage of the electric signal, or the like.

The general-purpose IC 23 provided for the actuator 21 acquires the digital signal that defines the operation of the hardware unit 1 from the signal bus 2. The general-purpose IC 23 generates a control signal for the actuator 21, based on the operation defined by the acquired digital signal. The general-purpose IC 23 continues to give the generated control signal to the actuator 21 until a new digital signal is acquired.

The general-purpose IC 23 provided for the sensor 22 generates a digital signal that indicates a state of the hardware unit 1, based on a data signal acquired from the sensor 22, and outputs the digital signal to the signal bus 2. The digital signal represents physical quantity data indicating a state of the hardware unit 1. Specifically, the physical quantity data is a temperature, a pressure, a rotation speed, or the like.

The controller 10 acquires a digital signal that indicates a state of each of the hardware units 1 from the signal bus 2. The arithmetic device 11 performs an arithmetic operation that determines a next operation of the mobile body, based on the state of the hardware unit 1 indicated by the acquired digital signal. In accordance with a result of the arithmetic operation, the arithmetic device 11 generates a digital signal that defines an operation of the actuator 21. A cycle in which the controller 10 generates the digital signal is much longer than a cycle in which the general-purpose IC 23 gives the control signal to the actuator 21.

Figure 2:
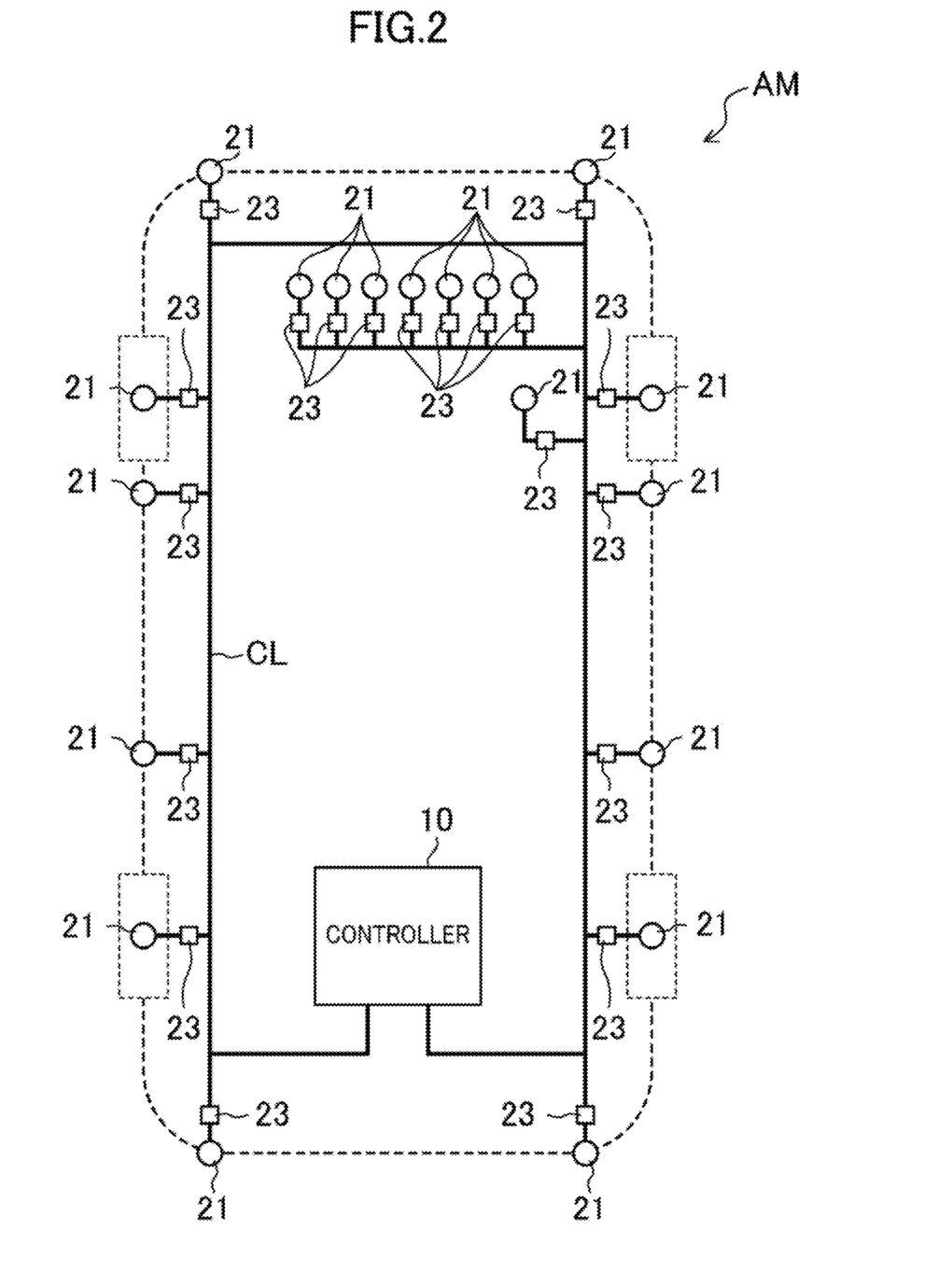
FIG. 2 is a schematic diagram illustrating a communication network of the control system.

FIG. 2 illustrates a configuration example in a case where the control system according to this embodiment is applied to a vehicle. In FIG. 2, a vehicle AM is provided with the plurality of actuators 21. Each of the actuators 21 is connected to the corresponding general-purpose IC 23. Each of the general-purpose ICs 23 is connected to the controller 10 via a communication line CL. The communication line CL is an example of a device that realizes the signal bus 2 of FIG. 1 and, for example, a communication speed of the signal bus 2 is 1 Gbps or more.

The vehicle AM illustrated in FIG. 2 is an automobile that can perform assist driving in which the automobile assists an operation of a driver to travel and automatic driving in which the automobile travels without an operation of the driver as well as manual driving in which the automobile travels by an operation of the driver. In the vehicle AM, a by-wire method in which control is electrically performed in driving control, braking control, and steering control is employed. That is, in the vehicle AM, each of an operation of an accelerator pedal, an operation of a brake pedal, and an operation of a steering wheel are detected by a corresponding sensor. Then, the actuator 21 that performs each control is controlled by a control signal generated by the controller 10, based on an output of the sensor. Note that, in FIG. 2, the controller 10 is arranged in a rear portion of the vehicle AM, but an arrangement of the controller 10 is not limited thereto.

Figure 3:
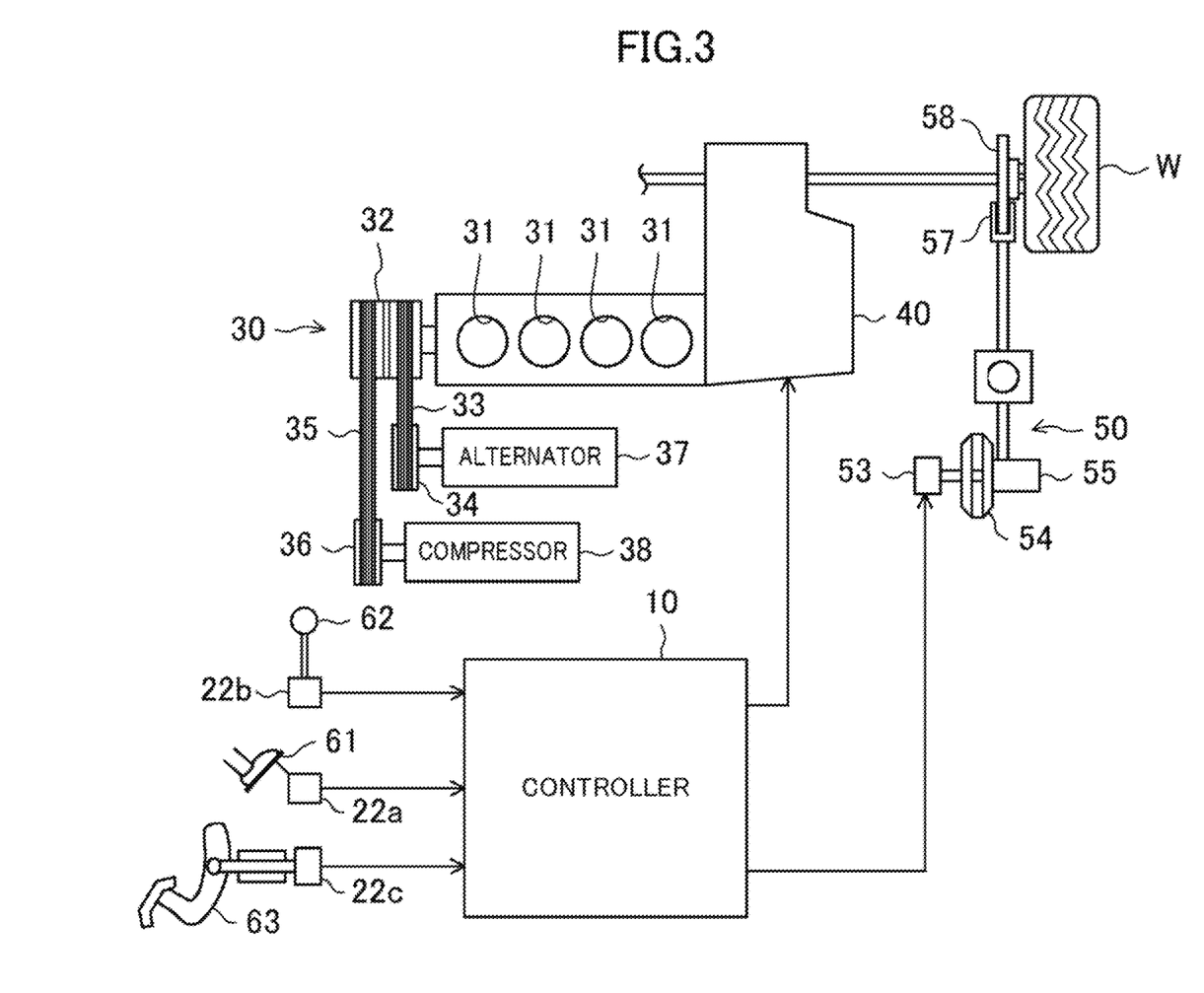
FIG. 3 is a schematic diagram illustrating configurations of a driving system and a braking system.

FIG. 3 illustrates a relationship of a driving system and a braking system mounted on the vehicle AM with the controller 10 in more detail.

The driving system of the vehicle AM includes an engine 30 as a driving source provided with a plurality of (four in this embodiment) cylinders 31 and a transmission 40 connected to the engine 30. The braking system of the vehicle AM includes a brake 50 that brakes rotation of a drive wheel W.

The engine 30 is, for example, a gasoline engine. Each of the cylinders 31 of the engine 30 is provided with an injector that supplies a fuel into the cylinder 31 and an ignition plug that ignites a mixture of the fuel and intake air supplied to the cylinder 31. The engine 30 includes an intake valve, an exhaust valve, and a valve system that adjusts opening/closing of the intake valve and the exhaust valve provided for each of the cylinders 31. The engine 30 is provided with a piston that reciprocates in the cylinder 31 and a crankshaft connected to the piston via a connecting rod.

Rotation of the crankshaft of the engine 30 is transmitted to another actuator via a pulley. For example, as illustrated in FIG. 3, an engine side pulley 32 connected to the crankshaft is provided in one side of the engine 30 in a direction of a cylinder bank. A first output pulley 34 is driven and connected to the engine side pulley 32 via a first belt 33. A second output pulley 36 is also driven and connected to the engine side pulley 32 via a second belt 35. Rotation of the first output pulley 34 is transmitted to an alternator 37 as a generator. The alternator 37 rotates by rotation of the crankshaft to generate power. Rotation of the second belt 35 is transmitted to a compressor 38 of an air conditioner. The compressor 38 compresses a refrigerant used for air conditioning using rotation of the crankshaft. The alternator 37 and the compressor 38 as well as the injector or the like are components constituting the engine 30 and are actuators that can change an engine parameter that is a parameter related to an output of the engine 30.

The transmission 40 is, for example, a stepped automatic transmission. The transmission 40 is disposed in the other side of the engine 30 in the direction of the cylinder bank. The transmission 40 includes an input shaft (not illustrated) connected to the crankshaft of the engine 30 and an output shaft (not illustrated) connected to the input shaft via a plurality of reduction gears (not illustrated). The output shaft is connected to an axle of the drive wheel W. Rotation of the crankshaft is changed in speed by the transmission 40 and is transmitted to the drive wheel W.

The brake 50 includes a brake actuator 53, a booster 54 connected to the brake actuator 53, a master cylinder 55 connected to the booster 54, and a brake pad 57 that actually brakes rotation of the drive wheel W. A disk rotor 58 is provided to the axle of the drive wheel W. The brake 50 is an electric brake, operates the brake actuator 53 in accordance with an operation amount of a brake pedal 63 detected by a brake sensor 22c, and operates the brake pad 57 via the booster 54 and the master cylinder 55. The brake 50 brakes rotation of the drive wheel W by a friction force generated between the brake pad 57 and the disk rotor 58 with the disk rotor 58 sandwiched by the brake pad 57.

Operations of the engine 30, the transmission 40, and the brake 50 are controlled by the controller 10. For example, when the vehicle AM is manually driven, the controller 10 calculates a normative engine parameter of the engine 30, based on a detection value of an accelerator opening sensor 22a that detects an accelerator opening degree corresponding to the operation amount of the accelerator pedal by the driver, an outside air pressure, required power of an auxiliary machine (such as headlight or the like), a required output of the air conditioner, or the like, and controls a fuel injection amount and a fuel injection timing by the injector, an ignition timing by the ignition plug, a valve opening timing and a valve opening period of each of the intake and exhaust valves by the valve system, a load of the alternator 37, a load of the compressor 38, or the like. When the vehicle AM is manually driven, the controller 10 adjusts a gear stage of the transmission 40, based on a detection result of a shift sensor 22b that detects an operation of a shift lever 62 by the driver and a required driving force calculated from the accelerator opening degree. When the vehicle AM is manually driven, the controller 10 adjusts a gear stage of the transmission 40, based on a detection result of the shift sensor 22b that detects an operation of the shift lever 62 by the driver and a required driving force calculated from the accelerator opening degree. When the vehicle AM is manually driven, the controller 10 calculates a normative braking parameter described later, based on a detection value of the brake sensor 22c that detects an operation amount of the brake pedal 63 by the driver or the like, and controls an operation amount of the brake actuator 53. On the other hand, when the vehicle AM is automatically driven, the controller 10, basically, calculates a control amount of a component (the injector, the compressor 38, or the like) of the engine 30 such that the normative engine parameter calculated by the arithmetic device 11, based on an environment outside the vehicle, is realized, and outputs a control signal to the actuator. When the vehicle AM is automatically driven, the controller 10 basically calculates a control amount of the brake actuator 53 such that the normative braking parameter calculated by the arithmetic device 11, based on the environment outside the vehicle, is achieved and outputs a control signal to the brake actuator 53.

Figure 4:
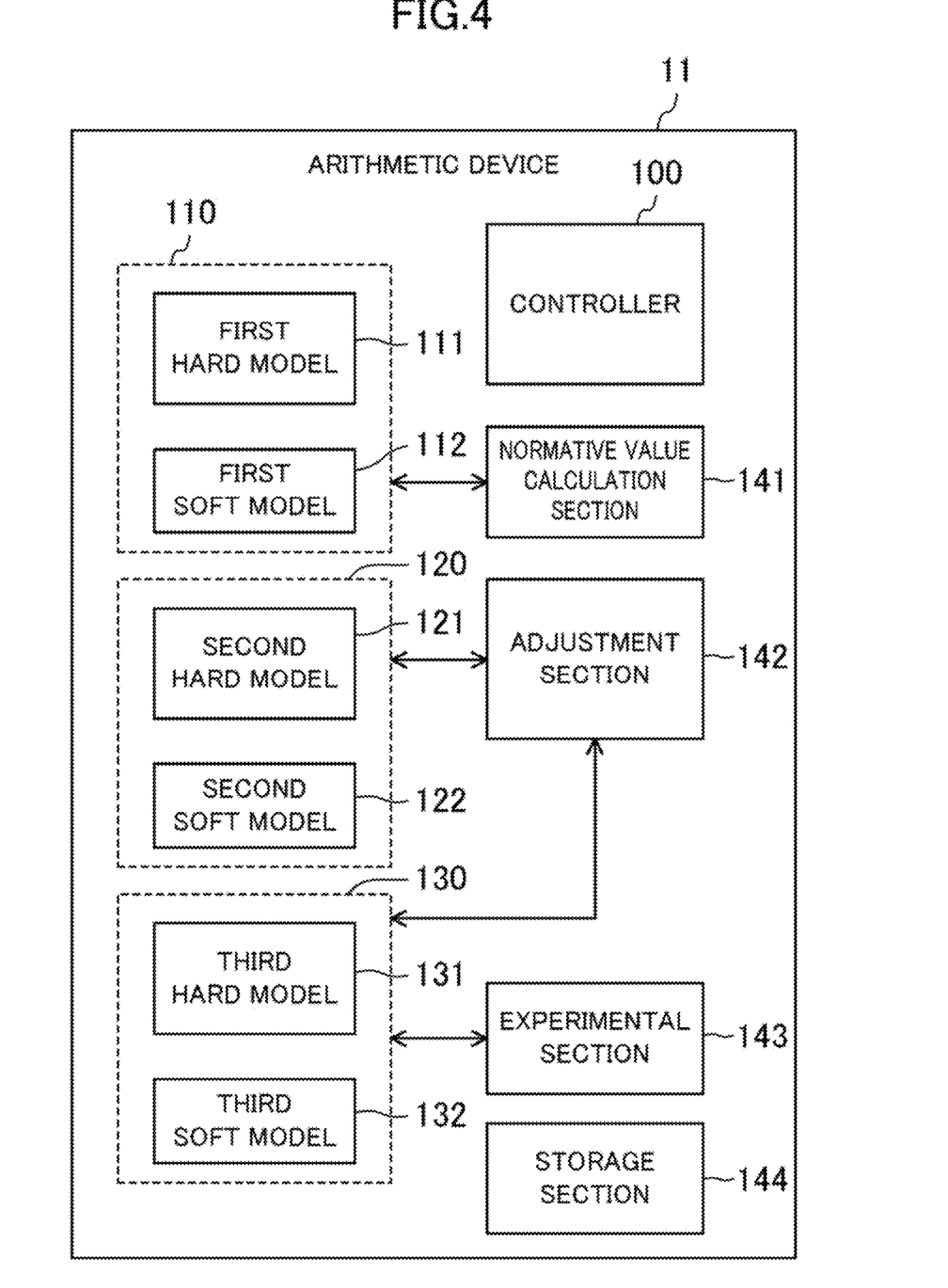
FIG. 4 is a block diagram illustrating a model mounted on an arithmetic device.

As illustrated in FIG. 4, the arithmetic device 11 includes a control section 100 configured to actually control each of the actuators 21 of the hardware units 1. The control section 100 calculates a target parameter that is a target output of each of the hardware units 1, based on input information from the sensor 22, and controls each of the actuators 21 such that the target parameter is output.

There is a difference between an actual parameter of each of the hardware units 1 exerted when the control section 100 controls each of the actuators 21 and the target parameter in some cases. This difference is generated due to deterioration of the actuator 21 itself, deterioration of a component (such as a pulley or a belt) that connects the actuators 21 to one another, or the like. Conventionally, a difference between an actual parameter and a target parameter is compensated by feedback control. However, when an actual cause for the difference is not known, the difference cannot be appropriately compensated. When control of the actual hardware unit 1 is changed in order to specify the cause, there is a probability that the change adversely influences traveling of the vehicle.

Therefore, in this embodiment, by storing multiple types of models in the arithmetic device 11 and performing simulations using the models, the cause for the difference between the actual parameter and the target parameter is specified and the actual parameter is caused to match the target parameter.

Specifically, the arithmetic device 11 includes a first identification model 110 including a first hard model 111 obtained by modeling a dynamic characteristic of the hardware unit 1 and a first soft model 112 configured to receive the same input information as input information input to the control section 100 from the sensor 22 and to execute the same processing as processing performed on each hardware unit 1 by the control section 100 on the first hard model 111. The arithmetic device 11 includes a second identification model 120 including a second hard model 121 obtained by modeling a dynamic characteristic of the hardware unit 1 and a second soft model 122 configured to receive the same input information as input information input to the control section 100 from the sensor 22 and to execute the same processing as processing performed on each hardware unit 1 by the control section 100 on the second hard model 121. The arithmetic device 11 includes an experimental model 130 including a third hard model 131 obtained by modeling a dynamic characteristic of the hardware unit 1 and a third soft model 132 configured to execute the same processing as processing performed on the hardware unit 1 by the control section 100 on the third hard model 131.

The arithmetic device 11 includes a normative value calculation section 141 configured to calculate a normative output value serving as a norm for the hardware unit 1 for the input information from the sensor 22 using the first identification model 110. The arithmetic device 11 includes an adjustment section 142 configured to update a dynamic characteristic of a model of the hardware unit 1 in the second hard model 121 such that an output value of the second hard model 121 obtained by processing of the second soft model 122 matches an actual output value of the hardware unit 1. The arithmetic device 11 includes an experimental section 143 configured to perform arithmetic processing on the third hard model 131 by the third soft model 132, based on a condition indicated by the same information as the input information from the sensor 22 or altered information obtained by changing the input information. Furthermore, the arithmetic device 11 includes a storage section 144 in which a control condition related to a control content used for controlling the hardware unit 1 by control section 100 is stored.

The first hard model 111 of the first identification model 110 is obtained by modeling the hardware unit 1 in a state where there is no malfunction in components. The components include not only the actuators 21 but also the pulleys (such as the engine side pulley 32, the first and second output pulleys 34 and 36 described above, or the like) provided in the engine, and the belts (such as the first and second belts 33 and 35, or the like described above) wound around the pulleys. The "state where there is no malfunction in components" expresses, for example, a state (a brand-new state) where aged deterioration has not occurred in the components.

The normative value calculation section 141 performs the same arithmetic processing as processing performed on the hardware unit 1 by the control section 100 on the first hard model 111 by the first soft model 112 to calculate the normative output value of the hardware unit 1 for the input information from the sensor 22. In other words, the normative value calculation section 141 performs a simulation using the first identification model 110, based on an actual value of the sensor 22. As described above, the first hard model 111 is obtained by modeling the hardware unit 1 in a state where there is no malfunction in the components, and therefore, an output value of the first hard model 111 is an ideal value of the hardware unit 1 for the input information from the sensor 22. That is, the normative output value calculated by the normative value calculation section 141 corresponds to the target parameter for each hardware unit 1 set by the control section 100, based on the input information from the corresponding sensor 22.

The simulation performed by the normative value calculation section 141 is executed on each of the hardware units 1 and the normative output value is calculated for the each of the hardware units 1. For example, the normative value calculation section 141 calculates the normative engine parameter that is an output value serving as a norm for the engine 30 for input information, such as the accelerator opening degree, an outside air pressure, or the like, using a model related to the engine 30 in the first hard model 111. The normative engine parameters include an engine torque, an idle speed, or the like. For example, the normative value calculation section 141 calculates the normative braking parameter that is an output value serving as a norm for the brake 50 for input information, such as a stepping amount of the brake pedal, or the like, using a model related to the brake 50 in the first hard model 111. The normative braking parameters include a time until the vehicle is parked, change in a braking force, or the like.

The adjustment section 142 updates, based on the normative output value and the actual output value of the hardware unit 1, a dynamic characteristic of the second hard model 121 such that an output value of the second hard model 121 obtained by the processing of the second soft model 122 matches the actual output value of the hardware unit 1. The adjustment section 142 performs similar update on the third hard model 131 when updating the second hard model 121. Note that the expression "the output value of the second hard model 121 matches the actual output value of the hardware unit 1" means that the output value of the second hard model 121 is extremely close to the actual output value of the hardware unit 1 and includes a case where the output value of the second hard model 121 agrees with the actual output value of the hardware unit 1.

When there is a difference between the normative output value and the actual output value, the adjustment section 142 verifies a cause of the difference using the second identification model 120. This will be described with reference to flowcharts of FIG. 5 and FIG. 6.

Figure 5:
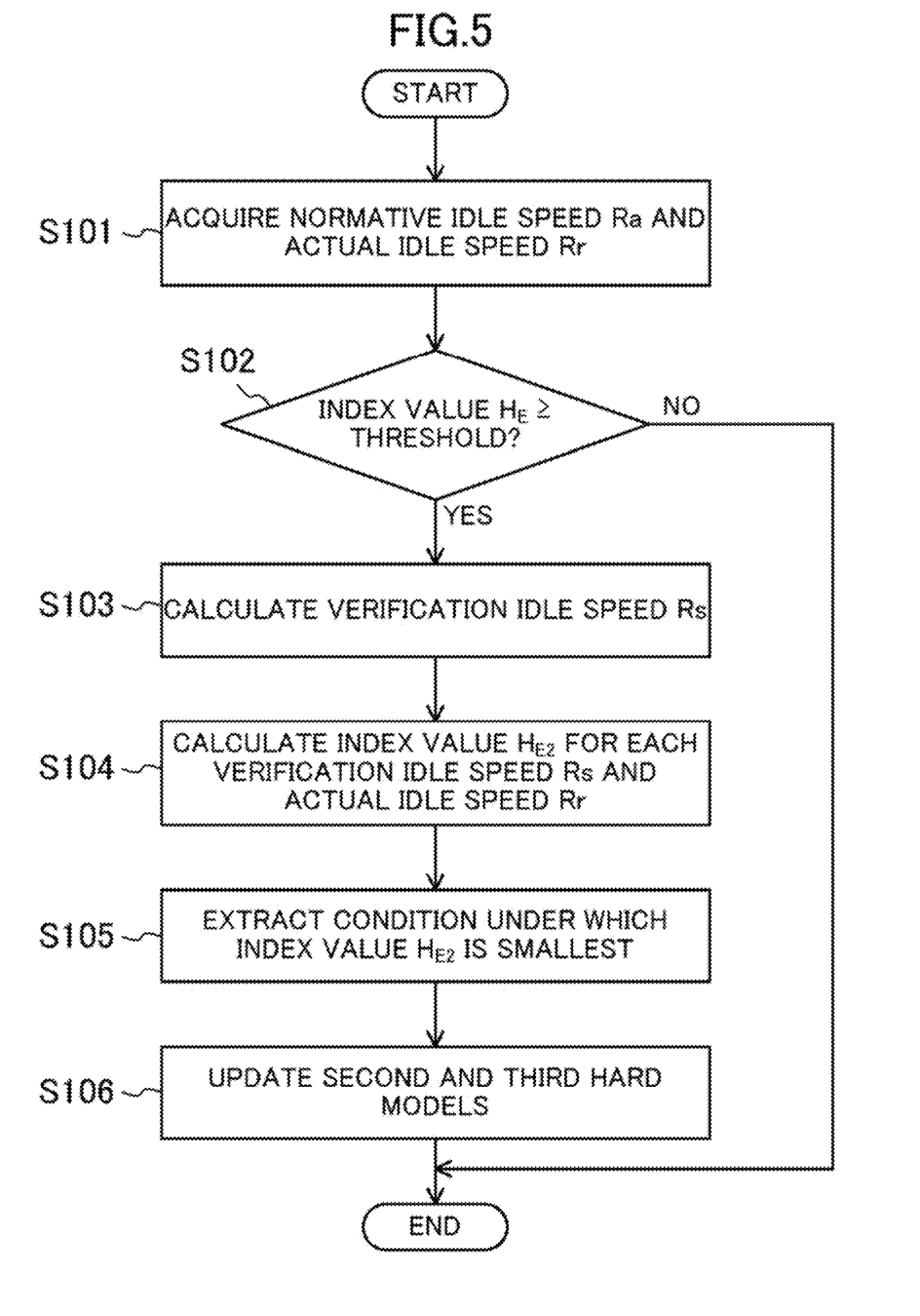
FIG. 5 is a flowchart illustrating update processing of a model by an adjustment section, illustrating a case where a model of an engine is updated.

FIG. 5 illustrates a flowchart used when a difference between a normative idle speed and an actual idle speed for the idle speed that is one engine parameter is generated during idle driving of a vehicle. There are various possible causes for generation of the difference between the actual idle speed and the normative idle speed, including (i) increase in load of the compressor 38 of the air conditioner by degassing, (ii) a slip of the second output pulley 36 connected to the compressor 38, (iii) deterioration of the alternator 37, (iv) a slip of the first output pulley 34 connected to the alternator 37, (v) deterioration of a piston ring, or the like. The adjustment section 142 verifies what is a closest cause among the possible causes, using the second identification model 120.

First, in Step S101, the adjustment section 142 acquires a normative idle speed Ra calculated by the normative value calculation section 141 and an actual idle speed Rr exerted by engine control of the control section 100. The actual idle speed Rr is detected, for example, by a crank angle sensor.

Next, in Step S102, the adjustment section 142 determines whether an index value $H_E$ for the normative idle speed Ra and the actual idle speed Rr is equal to or more than a preset threshold. The index value $H_E$ is a value indicating a degree of deviation between the normative idle speed Ra and the actual idle speed Rr in this case. The index value $H_E$ is a value obtained by time-integrating a value obtained by squaring the difference between the normative idle speed Ra and the actual idle speed Rr by a predetermined time, for example, as expressed by an expression below.

$$H_{E1} = \int (Ra - Rr)^2 dt \qquad \text{[Expression 1]}$$

The smaller the index value $H_E$ is, the smaller the difference between the normative idle speed Ra and the actual idle speed Rr is. The adjustment section 142 causes the process to proceed to Step S103 if a determination result is YES indicating that an index value $H_{E1}$ is equal to or more than the threshold and, on the other hand, terminates the arithmetic processing without updating the second and third hard models 121 and 131 if the determination result is NO indicating that the index value $H_{E1}$ is less than the threshold.

In Step S103, the adjustment section 142 calculates each idle speed (which will be hereinafter referred to as a verification idle speed Rs) exerted by the second hard model 121 by the second soft model 122 while changing a state parameter (a friction coefficient of a model of the second output pulley or the like) of each component in the second hard model 121. The state parameter that is to be changed is preset, for example, by a table or the like. Next, in Step S104, the adjustment section 142 calculates an index value $H_{E2}$ for each verification idle speed Rs calculated in Step S103 and the actual idle speed Rr. For example, similar to the index value $H_{E1}$ described above, the index value $H_{E2}$ is a value obtained by time-integrating a value obtained by squaring a difference between the actual idle speed Rr and the verification idle speed Rs by a predetermined time.

Subsequently, in Step S105, the adjustment section 142 extracts a condition (a state parameter of a component) when the index value $H_{E2}$ is smallest. The condition under which the index value $H_{E2}$ is smallest is a condition under which the verification idle speed Rs matches the actual idle speed Rr and a reason for this is that it can be considered that, under this condition, a state of the actual engine 30 is reproduced most precisely. For example, in a case where, when a friction force of the second output pulley 36 is reduced, the index value $H_{E2}$ is smallest, the adjustment section 142 extracts a condition under which the friction force of the second output pulley 36 is reduced.

Then, in Step S106, the adjustment section 142 updates a model of the engine 30 in the second and third hard models 121 and 131, based on the condition extracted in Step S105. For example, when the condition under which the friction force of the second output pulley 36 is reduced is extracted in the manner described above, the adjustment section 142 updates the model of the second output pulley in the second hard model 121. After Step S106, the adjustment section 142 terminates the arithmetic processing.

Figure 6:
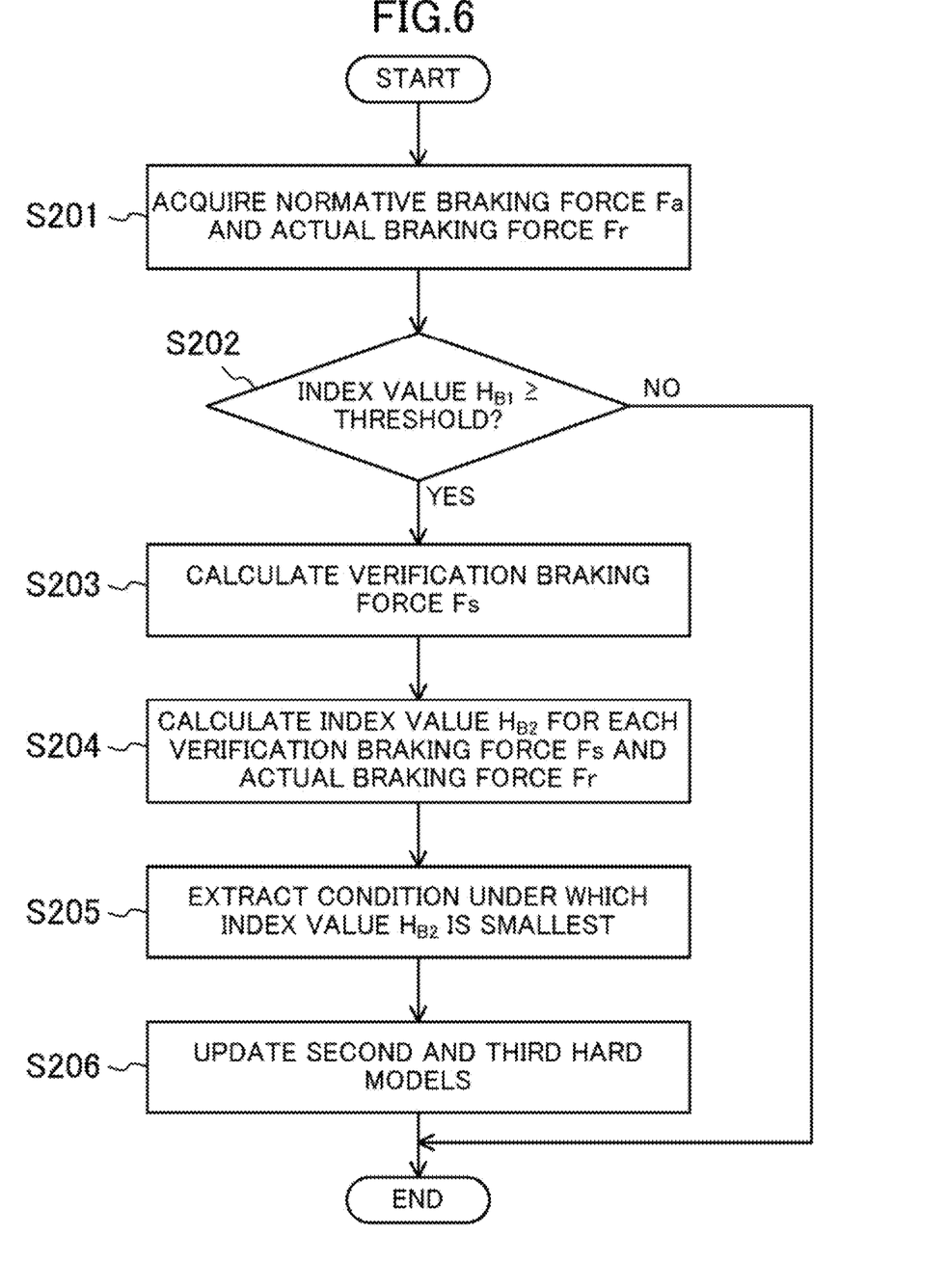
FIG. 6 is a flowchart illustrating update processing of a model by an adjustment section, illustrating a case where a model of a brake is updated.

On the other hand, FIG. 6 illustrates a flowchart used when a difference between a normative braking force and an actual braking force for the braking force that is one braking parameter is generated during traveling of a vehicle. There are various possible causes for generation of the difference between the actual braking force and the normative braking force, including (i) a malfunction of the brake actuator 53, (ii) a malfunction of the booster 54, (iii) change in friction of the brake pad 57, or the like. Similar to the above-described case of the engine 30, the adjustment section 142 verifies what is a closest cause among the possible causes, using the second identification model 120.

First, in Step S201, the adjustment section 142 acquires a normative braking force Fa calculated by the normative value calculation section 141 and an actual braking force Fr exerted by control of the brake 50 by control of the control section 100. The actual braking force Fr is detected, for example, by an acceleration sensor.

Next, in Step S202, the adjustment section 142 determines whether an index value $H_{B1}$ for the normative braking force Fa and the actual braking force Fr is equal to or more than a preset threshold. Similar to the above-described case of the engine 30, for example, as the index value $H_{B1}$, a value obtained by time-integrating a value obtained by squaring the difference between the normative braking force Fa and the actual braking force Fr by a predetermined time can be used. The adjustment section 142 causes the process to proceed to Step S203 if a determination result is YES indicating that the index value $H_{B1}$ is equal to or more than the threshold and, on the other hand, terminates the arithmetic processing without updating the second and third hard models 121 and 131 if the determination result is NO indicating that the index value $H_{B1}$ is less than the threshold.

In Step S203, the adjustment section 142 calculates each braking force (which will be hereinafter referred to as a verification braking force Fs) exerted by the second hard model 121 by the second soft model 122 while changing the state parameter (a friction force of the brake pad 57 or the like) of each component in the second hard model 121. The state parameter that is to be changed is preset, for example, by a table or the like.

Next, in Step S204, the adjustment section 142 calculates an index value $H_{B2}$ for each verification braking force Fs calculated in Step S203 and the actual braking force Fr. For example, similar to the index value $H_{B1}$ described above, the index value $H_{B2}$ is a value obtained by time-integrating a value obtained by squaring a difference between the actual braking force Fr and the verification braking force Fs by a predetermined time.

Subsequently, in Step S205, the adjustment section 142 extracts a condition (a state parameter of a component) when the index value $H_{B2}$ is smallest. The condition under which the index value $H_{B2}$ is smallest is a condition under which the verification braking force Fs matches the actual braking force Fr and it can be considered that, under this condition, a state of the actual brake 50 is reproduced most precisely.

Then, in Step S206, the adjustment section 142 updates a model of the brake 50 in the second and third hard models 121 and 131, based on the condition extracted in Step S205. After Step S206, the adjustment section 142 terminates the arithmetic processing.

In the manner described above, the adjustment section 142 updates the dynamic characteristic of the model of the hardware unit 1 in the second hard model 121 such that the output value of the second hard model 121 obtained by processing of the second soft model 122 matches the actual output value of the hardware unit 1.

Thus, when a malfunction has occurred in the hardware unit 1, a position in which the malfunction has occurred can be specified by performing verification by the adjustment section 142. A simulation performed by the adjustment section 142 is executed without using the actual hardware unit 1, and therefore, there is no adverse influence on travelling of the vehicle. A verification result of the adjustment section 142 is also output to the control section 100. When it can be recognized from information of the adjustment section 142 that a malfunction has occurred in a component of the hardware unit 1 (for example, the friction force of the second output pulley 36 is extremely small), the control section 100 reports the occurrence of the malfunction to the driver of the vehicle and urges the driver to exchange the target component. As a reporting method, a method for displaying the occurrence of the malfunction on a display of a car navigation system, a method for sending information to a mobile terminal of the driver, or like method can be used.

After update of the third hard model 131 is completed, the experimental section 143 performs a simulation using the third hard model 131 and the third soft model 132. There are two simulations performed by the experimental section 143. One of the two simulations is a first matching simulation in which the third soft model 132 is caused to control the third hard model 131, based on the same input information as input information input to the control section 100 from the sensor 22 and a control condition under which an experimental output value obtained by the third hard model 131 matches a normative output value calculated by the normative value calculation section 141 is calculated. By performing the first matching simulation, a control condition under which an actual output value can be made close to the normative output value can be calculated in a current state of the hardware unit 1. That is, the third hard model 131 updated by the adjustment section 142 is a model obtained by precisely producing the state of the actual hardware unit 1. Therefore, by controlling the hardware unit 1 by the control section 100 in accordance with the control content with which the output value of the third hard model 131 matches the normative output value, the actual output value can be made to match the normative output value. Note that the control content is, for example, the load of the alternator 37, the load of the compressor 38, a timing of fuel injection by the injector, or the like in the engine 30, and an operation amount of the brake actuator 53 or the like in the brake 50.

Figure 7:
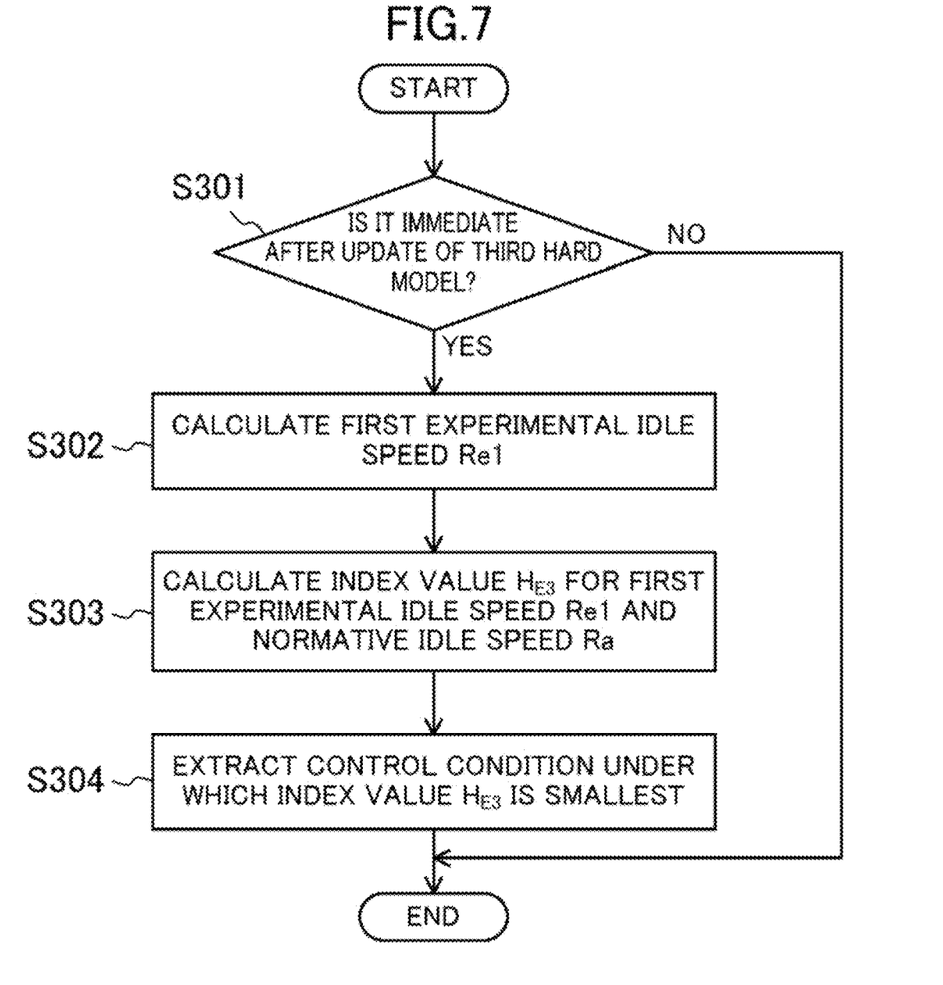
FIG. 7 is a flowchart illustrating a first matching simulation performed by an experimental section, illustrating a case where a control parameter for the engine is achieved.

The first matching simulation is executed only immediately after the third hard model 131 is updated by the adjustment section 142. The first matching simulation is executed each time the third hard model 131 is updated.

FIG. 7 illustrates an example of the first matching simulation. In FIG. 7, a control condition used for causing the idle speed to match the normative idle speed is calculated.

First, in Step S301, the experimental section 143 determines whether it is immediately after the third hard model 131 is updated. The experimental section 143 causes the process to proceed to Step S302 if a determination result is YES indicating that it is immediately after the third hard model 131 is updated and, on the other hand, terminates the first matching simulation if the determination result is NO indicating that it is not immediately after the third hard model 131 is updated.

Next, in Step S302, the experimental section 143 calculates each first experimental idle speed Re 1 for each control content while changing the control content of the third hard model 131 by the third soft model 132. The control content that is to be changed is preset, for example, by a table or the like.

Next, in Step S303, the experimental section 143 calculates an index value $H_{E3}$ for each first experimental idle speed Re1 and the normative idle speed Ra. As described above, as the index value $H_{E3}$, for example, a value obtained by time-integrating a value obtained by squaring a difference between the first experimental idle speed Re1 and the normative idle speed Ra by a predetermined time can be used.

Subsequently, in Step S304, the experimental section 143 extracts a control condition under which the index value $H_{E3}$ is smallest. The control condition under which the index value $H_{E3}$ is smallest is a condition under which the first experimental idle speed Re1 matches the normative idle speed Ra. After Step S304, the first matching simulation is terminated.

The experimental section 143 outputs the control condition extracted by the first matching simulation to the control section 100. For example, when a condition under which the load of the compressor 38 is reduced is extracted, the control section 100 causes the load of the compressor 38 to be smaller than a load in an immediately preceding control condition. Thus, the actual idle speed Rr of the engine 30 can be caused to match the normative idle speed Ra.

Figure 8:
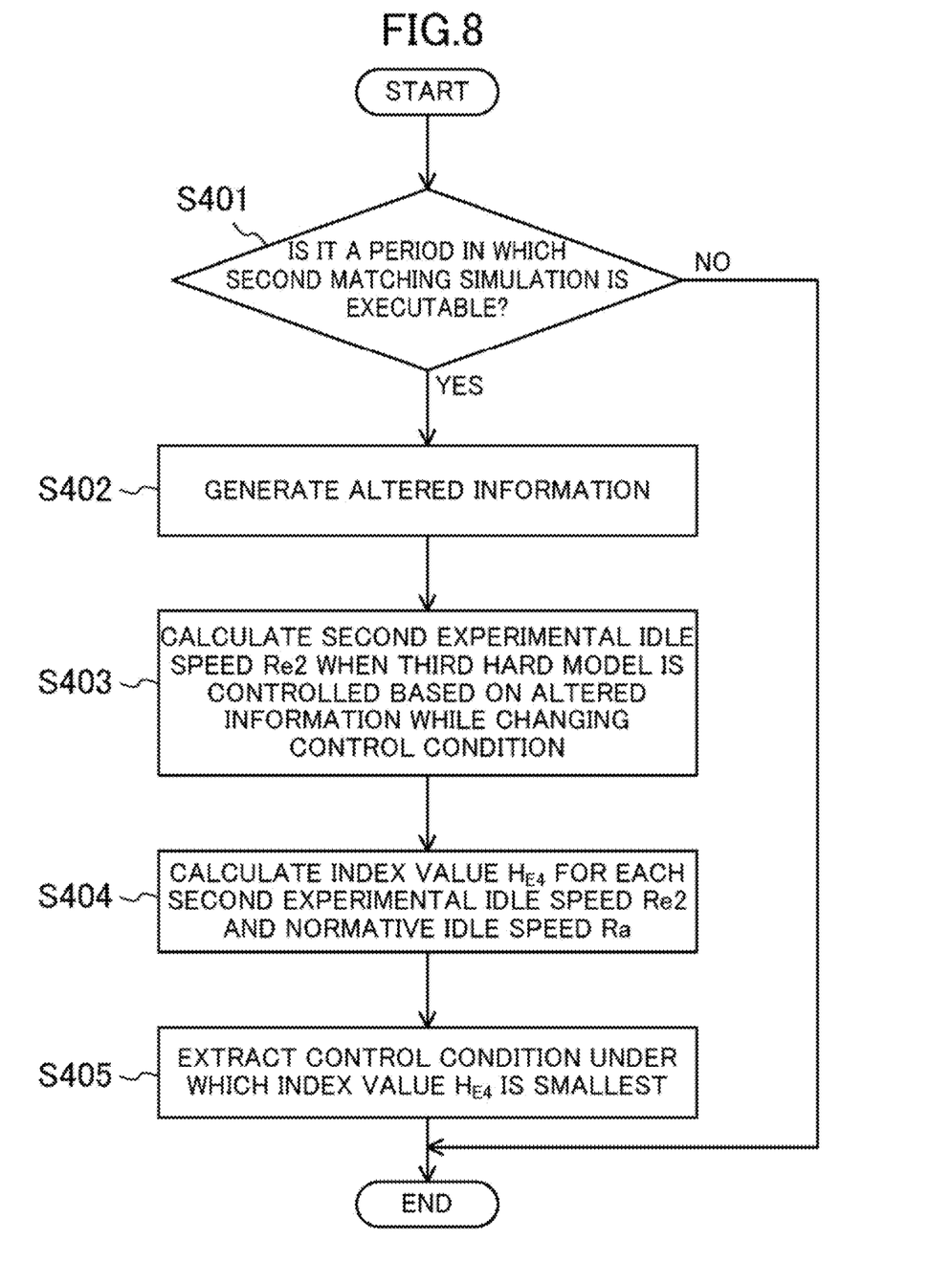
FIG. 8 is a flowchart illustrating a second matching simulation performed by the experimental section, illustrating a case where a control parameter for the engine is achieved.

The other simulation executed by the experimental section 143 is a second matching simulation in which a specific control condition used for controlling the third hard model 131 is calculated based on altered information obtained by changing input information input to the control section 100 from the sensor 22 such that an output obtained when the third soft model 132 performs arithmetic processing on the third hard model 131 matches the normative output value calculated by the normative value calculation section 141. The experimental section 143 generates the altered information, based on the input information from the sensor 22, and executes the second matching simulation. The altered information is information obtained by changing the input information from the sensor 22 or the like to information including a more severe condition. Specifically, the altered information is information obtained by changing an atmosphere temperature outside the vehicle to a higher value than that of an actual atmosphere temperature, changing an uphill gradient to a larger value than that of the actual uphill gradient, changing a parameter representing roughness of a traveling path to a value representing a rougher traveling path than that of an actual travelling path, changing an atmosphere pressure to a lower value than that of an actual atmosphere pressure, or the like.

By executing the second matching simulation, based on the altered information, even when the environment outside the vehicle suddenly changes to an environment indicated by the altered information or is an environment that could not be conventionally assumed, the hardware unit 1 can be appropriately controlled by the control section 100. Specifically, when the vehicle is automatically driven, the vehicle is in a state where the driver cannot perform adjustment to change an accelerator stepping amount, based on his or her experience, and therefore, a measure using the second matching simulation is needed.

FIG. 8 illustrates an example of the second matching simulation. In FIG. 8, a control condition used for causing a second experimental idle speed calculated based on the altered information to match the normative idle speed is calculated.

First, in Step S401, the experimental section 143 determines whether it is a period in which the second matching simulation is executable. Specifically, the experimental section 143 determines whether it is a period in which the first matching simulation is not executed. The experimental section 143 causes the process to proceed to Step S402 if a determination result is YES indicating that it is a period in which the second matching simulation is executable and, on the other hand, terminates the second matching simulation if the determination result is NO indicating that it is not a period in which the second matching simulation is executable.

Next, in Step S402, altered information is generated based on the input information input from the sensor 22.

Next, in Step S403, the experimental section 143 calculates each second experimental idle speed Re2 when the third hard model 131 is controlled based on the generated altered information for each control content while changing the control content of the third hard model 131 by the third soft model 132. The control content that is to be changed is preset, for example, by a table or the like.

Next, in Step S404, the experimental section 143 calculates an index value $H_{E4}$ for each second experimental idle speed Re2 and the normative idle speed Ra. As described above, as the index value $H_{E4}$, for example, a value obtained by time-integrating a value obtained by squaring a difference between the second experimental idle speed Re2 and the normative idle speed Ra by a predetermined time can be used.

Subsequently, in Step S405, the experimental section 143 extracts, as the specific control condition, a control condition under which the index value $H_{E4}$ is smallest. The control condition under which the index value $H_{E4}$ is smallest is a condition under which the second experimental idle speed Re2 matches the normative idle speed Ra. After Step S405, the second matching simulation is terminated.

After the specific control condition is calculated, the experimental section 143 stores the specific control condition in the storage section 144. When the condition indicated by the input information from the sensor 22 is similar to a condition indicated by the altered information, the control section 100 reads a specific control condition corresponding to the condition indicated by the altered information from the storage section 144 and controls the hardware unit 1 in accordance with the specific control condition. Thus, preparation can be made for an unusual environment in advance. In particular, by presetting an appropriate specific control condition, even while the vehicle is traveling by automatic driving, the control section 100 can control the hardware unit 1 without an operation by the driver such that an appropriate control condition is satisfied.

In the second matching simulation, a condition under which the hardware unit 1 cannot operate can be calculated. Specifically, assume that, when altered information in which information related to the environment outside the vehicle has been changed is generated and an output of the third hard model 131 is calculated, an output value cannot be obtained. In this case, the environment outside the vehicle indicated by the altered information is an environment where the hardware unit 1 cannot function. Also when the altered information with which the hardware unit 1 cannot function is obtained, the experimental section 143 causes the storage section 144 to store the altered information. When the input information from the sensor 22 or the like is similar to the altered information with which the hardware unit 1 cannot function, the control section 100 reports the driver that the input information is similar to the altered information to call the driver's attention.

The first matching simulation and the second matching simulation are executed without using the actual hardware unit 1, and therefore, there is no adverse influence on travelling of the vehicle.

Therefore, in this embodiment, the controller 10 includes the control section 100 configured to actually control the hardware unit 1, the first identification model 110 including the first hard model 111 obtained by modeling a dynamic characteristic of the hardware unit 1 and the first soft model 112 configured to receive the same input information as input information input to the control section 100 from the sensor 22 and to execute the same processing to processing performed on each hardware unit 1 by the control section 100 on the first hard model 111, the second identification model 120 including the second hard model 121 obtained by modeling the dynamic characteristic of the hardware unit 1 and the second soft model 122 configured to receive the same input information as input information input to the control section 100 from the sensor 22 and to execute the same processing as processing performed on the hardware unit 1 by the control section 100 on the second hard model 121, the normative value calculation section 141 configured to calculate a normative output value serving as a norm for the hardware unit 1 for the input information using the first identification model 110, and the adjustment section 142 configured to update the dynamic characteristic of a model of a hardware unit 1 in the second hard model 121, based on the normative output value and the actual output value of the hardware unit such that an output value of the second hard model 121 obtained by processing of the second soft model 122 matches an actual output value of the hardware unit 1. The second hard model 121 of the second identification model 120 is updated by the adjustment section 142 such that the normative output value matches the actual output value of the hardware unit 1. That is, the second hard model 121 is a model in which a position of a malfunction of the actual hardware unit 1 has been reproduced. Therefore, a position in which a malfunction has actually occurred can be specified based on this update information. As a result, the control section 100 can perform compensation in accordance with the position of the malfunction, and a control state of the vehicle as the mobile body can be made as close to a desired control state as possible.

In this embodiment, the controller 10 further includes the a experimental model 130 including the third hard model 131 obtained by modeling a dynamic characteristic of the hardware unit 1 and the third soft model 132 configured to execute the same processing as processing performed on the hardware unit 1 by the control section 100 on the third hard model 131, and the experimental section 143 configured to perform processing on the third hard model 131 by the third soft model 132, based on a condition indicated by the input information input to the control section 100 from the sensor 22 or altered information obtained by changing the input information, the adjustment section 142 is configured to perform similar update on the third hard model 131 when updating the second hard model 121, and the experimental section 143 calculates a specific control condition used for controlling the third hard model 131 such that an output obtained when the third soft model 132 performs processing on the third hard model 131 matches the normative output value calculated by the normative value calculation section 141. That is, similar update to update performed on the second hard model 121 is performed on the third hard model 131 of the experimental model 130, and therefore, a dynamic characteristic of the actual hardware unit 1 is reflected to the third hard model 131. Then, by performing a simulation using the experimental model 130 by the experimental section 143, control conditions in accordance with various environments can be calculated. For example, currently, by performing a simulation, based on information input to the control section 100 from the sensor 22, a control condition of the hardware unit 1 suitable for a current environment outside the vehicle can be calculated. By simulating how the output value of the hardware unit 1 changes when an outside air temperature is set extremely high or low as compared to an actual outside air temperature, the control condition of the hardware unit 1 can be set to an appropriate content (a content of the specific control condition) when the vehicle is exposed to any one of the environments. As a result, the operation of the vehicle as the mobile body can be more appropriately controlled.

In this embodiment, the controller 10 further includes the storage section 144 configured to store the specific control condition calculated by the experimental section 143, and the control section 100 reads the specific control condition corresponding to the condition indicated by the altered information from the storage section 144 and controls the hardware unit 1 in accordance with the specific control condition when the condition indicated by the input information from the sensor 22 is similar to a condition indicated by the altered information. As described above, the specific control condition of the hardware unit 1 can be calculated in advance for various environments by the experimental section 143 and the specific control conditions can be stored. Then, when an actual environment outside the vehicle is similar to an environment anticipated by the experimental section 143 in a simulation, the operation of the vehicle as the mobile body can be appropriately controlled only by reading the stored specific control condition corresponding thereto.

The technology disclosed herein is not limited to the above-described embodiment and can be substituted without departing from the spirit and scope of the present disclosure.

For example, in the above-described embodiment, cases where the models representing the engine 30 and the brake 50 in the second and the third hard models 121 and 132 are updated have been described. The present disclosure is not limited thereto and may be directed to a model of the transmission 40 or a model of a power steering in the second and third hard models 121 and 131.

In the above-described embodiment, a vehicle of automobile has been described as the mobile body. However, the present disclosure is not limited thereto and may be directed to an automatic conveying device in a factory or the like.

The above-described embodiment is a mere example, the scope of the present disclosure should not be restrictively interpreted. The scope of the present disclosure is defined by the appended claims, and all modifications and changes within an equivalent scope of the claims fall within the scope of the present disclosure.

What is claimed is:

1. A control device for an automobile with a hardware unit mounted therein and used for moving a vehicle, comprising:
a control section configured to actually control the hardware unit;
a first identification model including a first hard model obtained by modeling a dynamic characteristic of the hardware unit for simulation and a first soft model in which the control section is modeled for simulation and which is configured to receive same input information as input information input to the control section and to execute same processing as processing performed on each hardware unit by the control section on the first hard model;
a second identification model including a second hard model obtained by modeling a dynamic characteristic of the hardware unit for simulation and a second soft model in which the control section is modeled for simulation and which is configured to receive same input information as input information input to the control section and to execute same processing as processing performed on the hardware unit by the control section on the second hard mode;
a normative value calculation section configured to calculate a normative output value that is an output value serving as a norm for the hardware unit for the input information using the first identification model and an output value when no malfunction occurs in the hardware unit; and
an adjustment section configured to update a dynamic characteristic of a model of a hardware unit in the second hard model, based on the normative output value and an actual output value of the hardware unit, such that an output value of the second hard model obtained by processing of the second soft model matches the actual output value of the hardware unit,
the hardware unit including an engine having a compressor that compresses refrigerant used for air conditioning using rotation of a crank shaft,
the compressor including an output pulley connected to an engine side pulley connected to the crank shaft via a belt,
the normative value calculation section calculating a normative idle speed as engine output as a norm,
a dynamic characteristic of the engine modeled by the second hard model including a friction coefficient of the output pulley,
the adjustment section calculating an index value indicating a degree of deviation between a normative idle speed calculated by the normative value calculation section and an actual idle speed when the engine is controlled by the control section apart from an actual control of the engine performed by the control section and, when the index value is equal to or more than a preset threshold, changing a friction coefficient of the output pulley modeled by the second hard model.

2. The control device for the automobile of claim 1, further comprising:
an experimental model including a third hard model obtained by modeling a dynamic characteristic of the hardware unit for simulation and a third soft model obtained by modeling by the control section for simulation and configured to execute same processing as processing performed on the hardware unit by the control section on the third hard model; and
an experimental section configured to perform processing on the third hard model by the third soft model, based on a condition indicated by the input information or altered information obtained by changing the input information,
wherein
the adjustment section is configured to perform similar update on the third hard model when updating the second hard model, and
the experimental section calculates a specific control condition used for controlling the third hard model such that an output obtained when the third soft model performs processing on the third hard model matches the normative output value calculated by the normative value calculation section.

3. The control device for the automobile of claim 2, further comprising:
a storage section configured to store the specific control condition calculated by the experimental section,
wherein
the control section reads the specific control condition corresponding to a condition indicated by the altered information from the storage section and controls the hardware unit in accordance with the specific control condition when the condition indicated by the input information is similar to the condition indicated by the altered information.

4. The control device for the automobile of claim 2, wherein
the hardware unit includes a brake configured to brake rotation of a driving wheel by a friction force generated between a brake pad and a disk rotor with the disk rotor sandwiched by the brake pad,
the dynamic characteristic of the brake modeled by the second hard model includes a friction force of the brake pad, and
the adjustment section calculates an index value indicating a degree of deviation between a normative braking force calculated by the normative value calculation section and an actual braking force when the brake is controlled by the control section apart from the actual control of the brake performed by the control section and, when the index value is equal to or more than a preset threshold, changes the friction force of the brake pad modeled by the second hard model.

5. The control device for the automobile of claim 1, wherein
the hardware unit includes a brake configured to brake rotation of a driving wheel by a friction force generated between a brake pad and a disk rotor with the disk rotor sandwiched by the brake pad,
the normative value calculation section calculates a normative braking force as a parameter related to braking serving as a norm,
the dynamic characteristic of the brake modeled by the second hard model includes a friction force of the brake pad, and
the adjustment section calculates an index value indicating a degree of deviation between a normative braking force calculated by the normative value calculation section and an actual braking force when the brake is controlled by the control section apart from the actual control of the brake performed by the control section and, when the index value is equal to or more than a preset threshold, changes the friction force of the brake pad modeled by the second hard model.

6. A control device with a hardware unit mounted therein and used for traveling a vehicle, comprising:
- a control section configured to actually control the hardware unit;
- a first identification model including a first hard model obtained by modeling a dynamic characteristic of the hardware unit for simulation and a first soft model obtained by modeling by the control section for simulation and configured to receive same input information as input information input to the control section and to execute same processing as processing performed on each hardware unit by the control section on the first hard model;
- a second identification model including a second hard model obtained by modeling a dynamic characteristic of the hardware unit for simulation and a second soft model obtained by modeling by the control section for simulation and configured to receive same input information as input information input to the control section and to execute same processing as processing performed on the hardware unit by the control section on the second hard mode;
- a normative value calculation section configured to calculate a normative output value that is an output value serving as a norm for the hardware unit for the input information using the first identification model and an output value when no malfunction occurs in the hardware unit; and
- an adjustment section configured to update a dynamic characteristic of a model of a hardware unit in the second hard model, based on the normative output value and an actual output value of the hardware unit, such that an output value of the second hard model obtained by processing of the second soft model matches the actual output value of the hardware unit,
- the hardware unit including the brake configured to brake rotation of a driving wheel by a friction force generated between a brake pad and a disk rotor with the disk rotor sandwiched by the brake pad,
- the normative value calculation section calculating a normative braking force as a parameter related to braking serving as a norm,
- the dynamic characteristic of the brake modeled by the second hard model including a friction force of the brake pad, and
- the adjustment section calculating an index value indicating a degree of deviation between a normative braking force calculated by the normative value calculation section and an actual braking force when the brake is controlled by the control section apart from an actual control of the brake performed by the control section and, when the index value is equal to or more than a preset threshold, changing the friction force of the brake pad modeled by the second hard model.

7. The control device for the automobile of claim 6, further comprising:
- an experimental model including a third hard model obtained by modeling a dynamic characteristic of the hardware unit and a third soft model in which the control section is modeled for simulation and which is configured to execute same processing as processing performed on the hardware unit by the control section on the third hard model;
- an experimental section configured to perform processing on the third hard model by the third soft model, based on the condition indicated by the input information or altered information obtained by changing the input information; and
- a storage section configured to store the specific control condition calculated by the experimental section, wherein
- the adjustment section is configured to perform similar update on the third hard model when updating the second hard model,
- the experimental section calculates a specific control condition used for controlling the third hard model such that an output obtained when the third soft model performs processing on the third hard model matches the normative output value calculated by the normative value calculation section, and
- the control section is configured to read the specific control condition corresponding to the condition indicated by the altered information from the storage section and control the hardware unit in accordance with the specific control condition when the condition indicated by the input information is similar to a condition indicated by the altered information.

* * * * *